March 6, 1962     W. C. N. HOPKINS     3,023,995
SEALING AND COUPLING STRUCTURES
Filed July 21, 1958     2 Sheets-Sheet 1
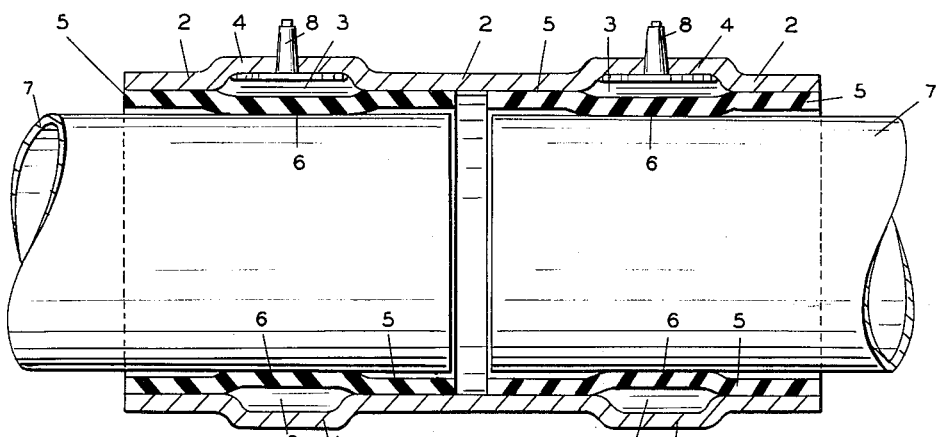
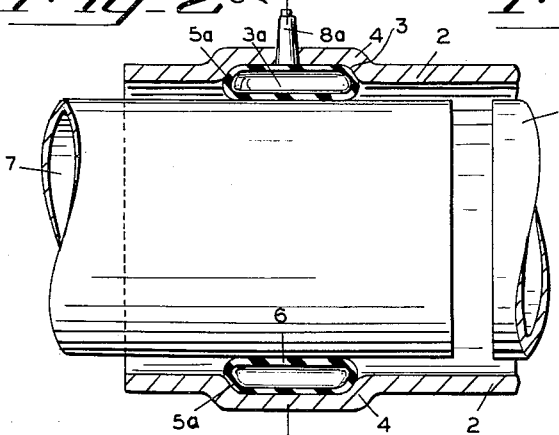
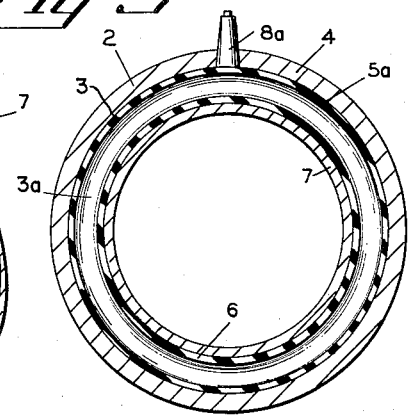
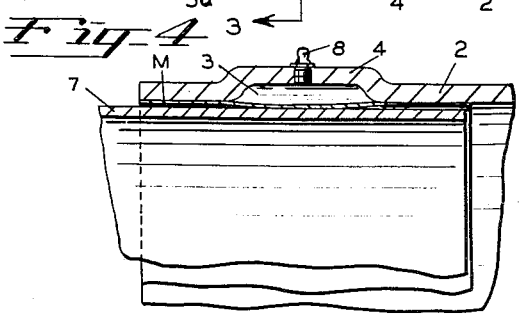
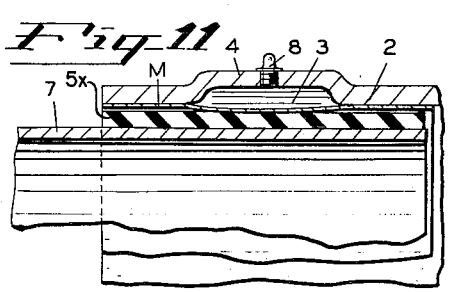
INVENTOR.
WILLIAM C.N. HOPKINS
BY Peter Haberlin
ATTORNEY March 6, 1962 W. C. N. HOPKINS 3,023,995
SEALING AND COUPLING STRUCTURES
Filed July 21, 1958 2 Sheets-Sheet 2
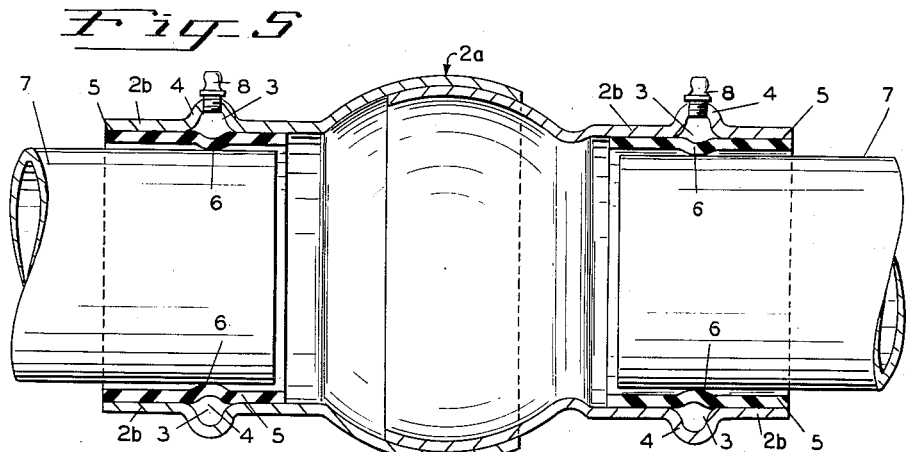
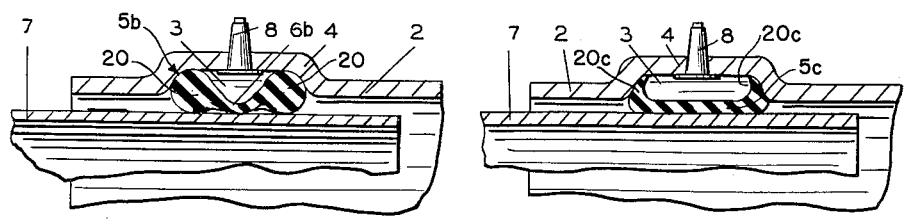
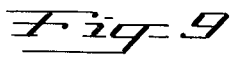
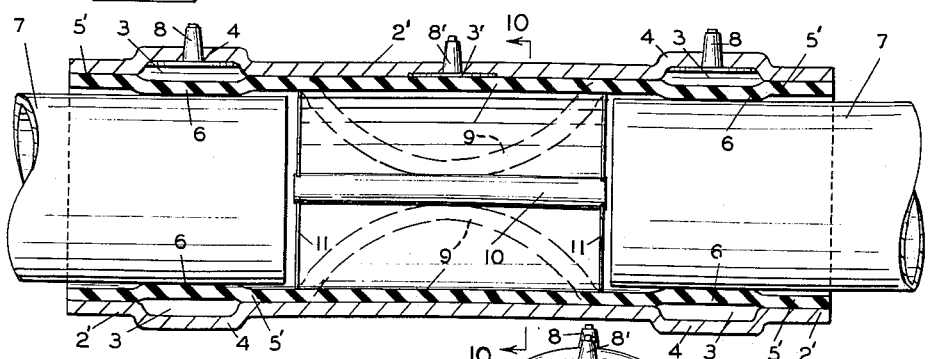
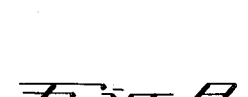
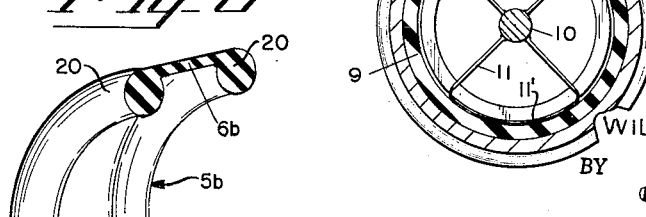
INVENTOR.
WILLIAM C. N. HOPKINS
BY Peter Haberlin
ATTORNEY

United States Patent Office 3,023,995
Patented Mar. 6, 1962

3,023,995
SEALING AND COUPLING STRUCTURES
William C. N. Hopkins, 1532 SE. 3rd Ave.,
Portland, Oreg.
Filed July 21, 1958, Ser. No. 749,724
5 Claims. (Cl. 251—5)

This invention relates to sealing and coupling structures, and more particularly to a system of sealing and coupling pipes which are used for irrigation purposes and many other adaptations, and so constructed that the pipes fitted into sleeves are held in place by force of fluid pressure applied to expansible linings affixed to the sleeve portion of the assembly.

One object of the invention is to provide coupling sleeves having linings forming annular, internally expansible chamber portions adjacent the ends of said sleeves so that the chamber portions may be inwardly expanded by fluid pressure for the purpose of holding pipes within the sleeve; and further to provide fluid valves which pass fluid into the chambers of the sleeves to expand the free portion of the linings and causing them to register with the inserted pipes.

Another object is to provide coupling structures that may be connected and dissembled without the necessity of tools and may be operated by persons having ordinary mechanical skill, since the pipes may be passed into the sleeves and affixed into place by means of fluid pressure applied to valves and released by exhausting said fluid pressure.

Other objects and advantages of the invention will become apparent in the following specification and appended claims, which taken in connection with the accompanying drawings, form part of this application, in which FIG. 1 is a longitudinal section of a coupling having a lining of resilient and tenacious material contacting pipes inserted from each end of the coupling;

FIG. 2 is a similar fragmentary view showing an inner tube fitted within the chambered portion of the coupling;

FIG. 3 is a cross section taken on line 3—3 of FIG. 2;

FIG. 4 is a fragmentary longitudinal section of a modified embodiment of the invention comprising a lining composed of soft metal;

FIG. 5 is another longitudinal section showing a ball-and-socket form of coupling;

FIGS. 6 and 7 are fragmentary sections showing varied forms of annular contacting portions of the linings;

FIG. 8 is a fragment of the annular contacting portion of FIG. 6 in perspective;

FIG. 9 is an elongated form of sleeve showing an additional expansible portion of the lining to form a valve to cut off the flow of water;

FIG. 10 is a sectional view taken on line 10—10 of FIG. 9; and

FIG. 11 is a fragmentary longitudinal sectional view showing a modified form of FIG. 4.

Referring now with more detailed reference to the drawings, specifically to FIG. 1, a coupling in accordance with the present invention comprises a sleeve 2 having chambers 3 formed therein and reinforced by annular rings 4, with at least one lining 5 welded or otherwise adhered to the inside surface of sleeve 2, but having expansible portions 6 integral therewith and concentric with chambers 3. Fluid valves 8 are affixed to the annular rings 4 and in communication with the chambers 3 for admitting or exhausting fluid under pressure to expand or contract the portions 6 of the lining 5.

In assembling the coupling, pipes 7 are inserted into the respective ends of sleeve 2 and lining 5, these pipes 7 being of smaller cross section or diameter than that of lining 5 to enable ready insertion of the pipes and leaving a slight clearance between the pipes and the lining. The pipes are releasably sealed within the coupling by means of the expansion of portions 6 of lining 5 caused by air pressure forced into the chambers 3 through fluid valves 8 which are affixed to annular rings 4 of the sleeve. The coupling may be readily disassembled and either of the pipes removed from the sleeve by opening the respective valve 8 to exhaust the pressure from the corresponding chamber 3 to permit contraction or collapsing of the respective lining portion 6 so as to be disengaged from and release the particular pipe.

The coupling is subject to many modifications and, for example, the sleeve may constitute a straight cylindrical sleeve 2 of relatively short length, such as shown in FIG. 1, a relatively longer sleeve 2', such as shown in FIG. 9, to accommodate flow control means between the ends of the pipes, a ball and socket joint 2a having cylindrical sleeve portions 2b, as shown in FIG. 5, or any other suitable structure having sleevelike end portions. The expansible linings may constitute separate sleevelike elements 5 with one adjacent each end of the sleeve, as shown in FIGS. 1 and 5, a single sleevelike element 5' extending substantially the full length of the sleeve, as shown in FIG. 9, an annular sealed tube element 5a, as shown in FIGS. 2 and 3, in which event, the valves 8a are in communication with the interior 3a of the tubes with the tubes seated in the chambers 3 of the sleeve 2, annular ringlike elements 5b, FIGS. 6 and 8, having stiffened edge portions 20 connected by an intermediate web 6b so that the edge portions 20 can seat within the sides of the chamber 3, or modified ring elements 5c, as shown in FIG. 7, and having tapered edge portions 20c for fitting up into the sides of the chamber 3.

All of the foregoing linings or seals may be composed of any expansible, flexible or resilient material, such as rubber or suitable synthetic plastics. Alternatively, the lining may be constituted by a soft metal sleeve M which may directly engage the pipes 7, as shown in FIG 4, or may be arranged to cooperate with a gasketlike lining 5x, as shown in FIG. 11. Regardless of the form of sleeve or lining, the operation of all of the various modifications is identical.

As previously stated, FIG. 9 illustrates an elongated coupling having flow control means intermediate its length and, in assembly, disposed between the adjacent ends of the pipe 7. In this arrangement, the lining 5' extends the full length of the sleeve 2', and the sleeve is provided with an intermediate fluid control valve 8' seated within a shallow chamber or recess 3'. A shaft 10 is suspended in the central longitudinal portion thereof by means of arms 11, which are affixed to the ends of said shaft and have arcuate portions 11' at their ends and, as best shown in FIG. 10, these arcuate portions engage the inner perimeter of sleeve 2 and lining 5' in concentric relation therewith. When fluid pressure is supplied through valve 8', the intermediate portion 9 of the lining 5' is expanded as shown in the broken lines in FIG. 9 to surround shaft 10, forming a closure for the purpose of temporarily stopping the flow of liquid through pipes 7 when required by the operator, since the main source of control may be a great distance from the location of operation.

In order to operate the disclosed embodiments of this invention, the pipes 7 are inserted into coupling 2 a predetermined distance, then fluid pressure is supplied through valves 8, expanding free portions 6 of lining 5 until they register with pipes 7 to form a water and air tight juncture between said pipes and coupling.

It is obvious from the foregoing description that with this structure the necessity for separate gaskets, bell and spigot couplings, and bayonet lock couplings are entirely eliminated, since the expansion of portions of a single lining under fluid pressure forms a complete coupling system which is flexible enough to be used on any contour of ground surface, and efficient in operation.

While this invention has been described in detail and with specific illustrations, it is understood that other modifications in construction and arrangements of parts may be devised without departing from the spirit and scope of the invention. The present embodiment is illustrative but not restrictive, since the scope and purview of the invention is indicated by the appended claims rather than by the foregoing description.

Having thus fully illustrated and described an embodiment of the invention and a method of producing the same, in a manner that may enable others skilled in the art to which it appertains to construct and use the same, what is claimed and desired to be secured by Letters Patent, is:

1. In combination, a pair of pipes disposed in spaced relation, and a coupling assembly joining said pipes and effective to control fluid flow therethrough; said coupling assembly including a sleeve having its opposite end portions receiving corresponding ends of said pipes, said sleeve being provided with an annular channel on the inner surface of each end portion in surrounding relation to said pipes, an elastic lining disposed within said sleeve and bonded thereto only in the regions of said end portion thereof on either side of said channels, leaving a substantial intermediate portion of the lining between said channels unattached to said sleeve, said pipes being received within said sleeve to such an extent as to expose at least the major extent of said intermediate unattached portion of the lining therebetween, a pair of fluid valves fixed to said sleeve, one in communication with each of said channels, whereby fluid may be introduced into said channels to deform said lining into gripping, sealing contact with the respective pipes, a shaft extending between the spaced ends of said pipes within said sleeve and lining, arms fixed to the opposite ends of said shaft and extending into engagement with said lining for retaining said shaft fixed in centrally disposed position within said sleeve, and a further fluid valve fixed to said sleeve and communicating between the sleeve and the intermediate unattached portion of said lining to permit the introduction of fluid between said sleeve and intermediate unattached portion of the lining to deform the latter toward and into contact with said shaft to control the flow of fluid between said pipes.

2. A coupling assembly comprising a sleeve, flexible lining means within said sleeve and sealingly engaged with the inner surface of the sleeve adjacent the ends thereof and along a plurality of annular contact portions and defining annular sealed chambers surrounding the interior of the sleeve, a pipe inserted into each end of said sleeve and lining means therein with one of said chambers surrounding each pipe adjacent the end thereof, and fluid valves affixed to said sleeve and respectively in communication with each chamber to admit fluid under pressure to the respective chamber for forcing the chamber forming portion of said lining means inwardly, whereby the lining means portion of a chamber surrounding a pipe may be forced into contact with the pipe to seal against leakage and lock the pipe in predetermined relation with the sleeve.

3. A coupling assembly according to claim 2 wherein the facing ends of said pipes are spaced apart, and said chambers include a chamber adjacent each end of said sleeve for respective engagement with said pipe end portions, and a central chamber intermediate said pipe ends with the lining means forming said central chamber being expansible into the area between said pipe ends to control fluid flow through said sleeve and pipes.

4. A coupling assembly according to claim 3 comprising a shaft, and means in said sleeve mounting said shaft within said sleeve substantially axially thereof between the pipe ends and concentric of said central chamber for engagement by said central chamber forming lining means to close the passage through said sleeve between said pipes.

5. A coupling assembly according to claim 3 wherein said lining means comprises a single elastic liner extending substantially the full length of said sleeve.

References Cited in the file of this patent
UNITED STATES PATENTS

| | | |
|---|---|---|
| 1,800,085 | Kroeger et al. | Apr. 7, 1931 |
| 2,083,842 | Henning | June 15, 1937 |
| 2,546,638 | Humanson | Mar. 27, 1951 |
| 2,735,642 | Norman | Feb. 21, 1956 |
| 2,746,709 | Minor | May 22, 1956 |

FOREIGN PATENTS

| | | |
|---|---|---|
| 556,010 | Great Britain | Sept. 16, 1943 |
| 576,772 | Great Britain | Apr. 17, 1946 |